(12) United States Patent
Hamilton, II et al.

(10) Patent No.: US 8,381,225 B2
(45) Date of Patent: *Feb. 19, 2013

(54) AUTOMATED PROCESSOR REALLOCATION AND OPTIMIZATION BETWEEN LOGICAL PARTITIONS

(75) Inventors: Rick Allen Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1104 days.

This patent is subject to a terminal disclaimer.

(21) Appl. No.: 12/267,701

(22) Filed: Nov. 10, 2008

(65) Prior Publication Data

US 2009/0094612 A1    Apr. 9, 2009

Related U.S. Application Data

(63) Continuation of application No. 10/427,098, filed on Apr. 30, 2003, now Pat. No. 7,478,393.

(51) Int. Cl.
*G06F 9/46* (2006.01)
(52) U.S. Cl. .................................. 718/105; 718/104
(58) Field of Classification Search ................... None
See application file for complete search history.

(56) References Cited

U.S. PATENT DOCUMENTS

| | | | |
|---|---|---|---|
| 4,603,382 A | | 7/1986 | Cole et al. |
| 5,504,670 A | | 4/1996 | Barth et al. |
| 5,796,937 A | * | 8/1998 | Kizuka ........................... 714/13 |
| 5,875,464 A | | 2/1999 | Kirk |
| 5,889,989 A | | 3/1999 | Robertazzi et al. |
| 5,978,583 A | | 11/1999 | Ekanadham et al. |
| 6,061,761 A | | 5/2000 | Bachmat |
| 6,199,075 B1 | | 3/2001 | Ungar et al. |
| 6,230,183 B1 | | 5/2001 | Yocom et al. |
| 6,321,373 B1 | | 11/2001 | Ekanadham et al. |
| 6,327,587 B1 | | 12/2001 | Forster |
| 6,366,945 B1 | | 4/2002 | Fong et al. |

(Continued)

FOREIGN PATENT DOCUMENTS

| | | |
|---|---|---|
| JP | 06-103092 | 4/1994 |
| JP | 10-027167 | 1/1998 |

(Continued)

OTHER PUBLICATIONS

USPTO office action for U.S. Appl. No. 10/427,098 dated Aug. 13, 2007.

(Continued)

*Primary Examiner* — Kenneth Tang
(74) *Attorney, Agent, or Firm* — Yee & Associates, P.C.; Arthur Samodovitz

(57) ABSTRACT

A method and system for reallocating processors in a logically partitioned environment. The present invention comprises a Performance Enhancement Program (PEP) and a Reallocation Program (RP). The PEP allows an administrator to designate several parameters and identify donor and recipient candidates. The RP compiles the performance data for the processors and calculates a composite parameter. For each processor in the donor candidate pool, the RP compares the composite parameter to the donor load threshold to determine if the processor is a donor. For each processor in the recipient candidate pool, the RP compares the composite parameter to the recipient load threshold to determine if the processor is a recipient. The RP then allocates the processors from the donors to the recipients. The RP continues to monitor and update the workload statistics based on either a moving window or a discrete window sampling system.

12 Claims, 4 Drawing Sheets

U.S. PATENT DOCUMENTS

| | | | |
|---|---|---|---|
| 6,378,039 | B1 | 4/2002 | Obara et al. |
| 6,678,814 | B2 | 1/2004 | Arimilli et al. |
| 6,694,419 | B1 | 2/2004 | Schnee et al. |
| 6,915,402 | B2 | 7/2005 | Wilson et al. |
| 6,940,853 | B2 | 9/2005 | Yamada et al. |
| 6,961,835 | B2 | 11/2005 | Lightstone et al. |
| 6,968,441 | B1 | 11/2005 | Schnee |
| 6,970,973 | B2 | 11/2005 | Katsuragi et al. |
| 7,003,597 | B2 | 2/2006 | Georgiou et al. |
| 7,117,499 | B2 | 10/2006 | Kawamoto et al. |
| 7,140,020 | B2 | 11/2006 | McCarthy et al. |
| 7,281,249 | B2 | 10/2007 | Tarui et al. |
| 7,290,259 | B2 | 10/2007 | Tanaka et al. |
| 7,299,469 | B2 | 11/2007 | Hamilton, II et al. |
| 7,313,796 | B2 | 12/2007 | Hamilton, II et al. |
| 7,325,062 | B2 | 1/2008 | Hamilton, II et al. |
| 7,472,246 | B2 | 12/2008 | Hamilton, II et al. |
| 7,478,393 | B2 | 1/2009 | Hamilton, II et al. |
| 2001/0007557 | A1 | 7/2001 | Yamada et al. |
| 2002/0087611 | A1* | 7/2002 | Tanaka et al. ............ 709/1 |
| 2002/0112102 | A1 | 8/2002 | Tarui et al. |
| 2002/0178262 | A1* | 11/2002 | Bonnell et al. ............ 709/225 |
| 2002/0178337 | A1 | 11/2002 | Wilson et al. |
| 2003/0005215 | A1 | 1/2003 | Arimilli et al. |
| 2003/0037092 | A1 | 2/2003 | McCarthy et al. |
| 2003/0177310 | A1 | 9/2003 | Katsuragi et al. |
| 2004/0078541 | A1 | 4/2004 | Lightstone et al. |
| 2004/0221039 | A1 | 11/2004 | Hamilton, II et al. |

FOREIGN PATENT DOCUMENTS

| | | |
|---|---|---|
| JP | 11-065862 | 3/1999 |
| JP | 2002-202959 | 7/2002 |
| JP | 2002-259236 | 9/2002 |
| JP | 2003-067351 | 3/2003 |
| KR | 2001-50506 | 6/2001 |

OTHER PUBLICATIONS

USPTO final office action for U.S. Appl. No. 10/427,098 dated Feb. 6, 2008.

USPTO notice of allowance for U.S. Appl. No. 10/427,098 dated Aug. 7, 2008.

USPTO office action for U.S. Appl. No. 10/427,105 dated Mar. 9, 2007.

USPTO notice of allowance for U.S. Appl. No. 10/427,105 dated Jul. 5, 2007.

USPTO office action for U.S. Appl. No. 10/455,182 dated Feb. 27, 2007.

USPTO notice of allowance for U.S. Appl. No. 10/455,182 dated Aug. 23, 2007.

USPTO office action for U.S. Appl. No. 10/427,100 dated Jan. 8, 2007.

USPTO notice of allowance for U.S. Appl. No. 10/427,100 dated Jul. 13, 2007.

USPTO office action for U.S. Appl. No. 10/427,406 dated Sep. 13, 2006.

USPTO office action for U.S. Appl. No. 10/427,406 dated Apr. 15, 2008.

USPTO notice of allowance for U.S. Appl. No. 10/427,406 dated Aug. 21, 2008.

USPTO office action for U.S. Appl. No. 12/323,130 dated Jul. 9, 2010.

USPTO notice of allowance for U.S. Appl. No. 12/323,130 dated Dec. 22, 2010.

USPTO non-final office action dated Mar. 23, 2007 regarding U.S. Appl. No. 10/427,098, 17 pages.

USPTO notice of allowance dated Oct. 6, 2010 regarding U.S. Appl. No. 12/323,130, 4 pages.

USPTO notice of allowance dated Dec. 22, 2010 regarding U.S. Appl. No. 12/323,130, 7 pages.

USPTO notice of allowance dated Jul. 1, 2011 regarding U.S. Appl. No. 12/323,130, 14 pages.

USPTO non-final office action dated Apr. 15, 2008 regarding U.S. Appl. No. 10/427,406, 13 pages.

USPTO non-final office action dated Sep. 13, 2006 regarding U.S. Appl. No. 10/427,406, 12 pages.

* cited by examiner

AUTOMATED PROCESSOR REALLOCATION AND OPTIMIZATION BETWEEN LOGICAL PARTITIONS

This application is a continuation of application Ser. No. 10/427,098, filed Apr. 30, 2003, status allowed.

FIELD OF THE INVENTION

The present invention is related generally to method for increasing computer system efficiency and specifically to a computer program for reallocating processors amongst virtual systems.

BACKGROUND OF THE INVENTION

A computer system is a collection of computer components, such as processors, which work together to perform a specific task, and is well known in the art. The computer systems may be located in a single computer, such as a server, or in a plurality of computers, such as computer network. System administrators (hereinafter, administrators) are people who setup and manage computer systems. One of the tools used by administrators to increase the performance of a computer system is physical partitioning. Administrators physically partition a managed system by dedicating buses and predefined physical modules within the system to assist in creating the smaller partitioned systems, referred to as virtual systems. Each virtual system in a managed system appears to the end user as a completely separate system. In addition, virtual systems improve administrative flexibility and application performance.

Another method used by administrators to increase system performance is logical partitioning. Logical partitioning is a process which creates logical partitions within the managed system. Logical partitioning is distinct from physical partitioning in that there are no physically separated buses, memory, or processors in a logically partitioned system. Instead, the virtual systems are separated only by the system software. Similar to the physically partitioned system, each individual virtual system created by logical partitioning appears to the end user as a completely separate system. One advantage of logical partitioning is that logical partitioning permits much finer granularity in virtual system creation, such that any processor, memory, or adapter may be easily added or removed from a virtual system. Logical partitioning is generally controlled by a hardware management console outside of the managed system. The hardware management console controls the division of the managed system into the virtual systems and, if necessary, the reallocation of resources amongst the various virtual systems.

Recently, administrators have been able to move system hardware resources within the managed system with increased flexibility. When the reallocation occurs without having to reboot the managed system, the logical partitioning is known as dynamic logical partitioning. The prior art methods of dynamic reallocation require the system administrator to recognize the need for reallocation, and then manually reallocate the resources. For example, in a system comprising a first logical partition having eight central processing units (CPUs) and a second logical partition having eight CPUs, the system administrator may observe that during a peak processing period, the first logical partition is running at 100% CPU utilization and the second logical partition is running at 20% CPU utilization. Upon observing the disparity in CPU utilization, the administrator may manually move one or more processors from the second logical partition to the first logical partition to improve system performance during the peak processing period. Therefore, a need exists for a system and method to automate the control and movement of resources in a dynamic logical partitioning environment.

The need for automation within the reallocation process has been addressed by the prior art. U.S. Pat. No. 4,603,382 (the '382 patent) entitled "Dynamic Buffer Reallocation" discloses a method for dynamically reallocating data storage segments within a storage device. The '382 patent monitors the properties of the data storage device and reallocates the buffer segments when they exceed a predefined threshold. U.S. Pat. No. 5,875,464 (the '464 patent) entitled "Computer System with Private and Shared Partitions in Cache" discloses a partitioned cache memory buffer which monitors the allocation of tasks. The memory buffer of the '464 patent reallocates the tasks when necessary. U.S. Pat. No. 5,978,583 (the '583 patent) discloses a method of reallocating applications during the course of their execution. The method disclosed in the '583 patent monitors the applications and redistributes the applications when necessary based on various criteria. U.S. Pat. No. 6,366,945 (the '945 patent) entitled "Flexible Dynamic Partitioning of Resources in a Cluster Computing Environment" discloses a method for dynamic partitioning of a computer network. The method of the '945 patent monitors the resources within the virtual networks and moves resources among networks when required. However, the '945 patent is limited in that it does not disclose a method for dynamic logical partitioning of a managed network. Consequently, what is needed beyond the '382, '464, '583, and '945 patents is a method and system for dynamic logical partitioning of a managed system. Furthermore, a need exists for a method and system for reallocating resources among the computers within a virtual system.

SUMMARY OF THE INVENTION

The present invention, which meets the needs stated above, is a method and system for reallocating processors in a logically partitioned environment. The software embodiment of the present invention comprises a Performance Enhancement Program (PEP) and a Reallocation Program (RP). The PEP allows an administrator to designate a performance parameter, a capture interval, a sampling interval, a donor candidate pool, a recipient candidate pool, a donor load threshold and a recipient load threshold. The RP compiles the performance data for the processors and calculates a composite parameter. For each processor in the donor candidate pool, the RP compares the composite parameter to the donor load threshold to determine if the processor is a donor. For each processor in the recipient candidate pool, the RP compares the composite parameter to the recipient load threshold to determine if the processor is a recipient. RP then determines if processor reallocation is necessary. If reallocation is necessary, the RP allocates the processors from the donors to the recipients. The RP continues to monitor and update the workload statistics based on either a moving window or a discrete window sampling system. The partitioned system of the present invention does not require a reboot to reallocate processors.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
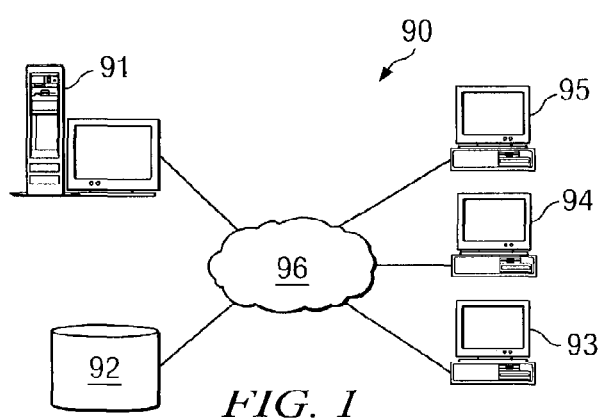
FIG. 1 is an illustration of a computer network used to implement the present invention.

As used herein the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "managed system" means a collection of hardware components, such as processors, which work together to accomplish a specific task. The hardware components may be located in a single computer or in a plurality of networked computers.

As used herein, the term "processor" means the central processing unit of a computer.

As used herein, the term "performance parameter" means one or more parameters used to measure the workload on a processor. Performance parameters include run queue, system time, and/or user time. Other performance parameters are known by persons skilled in the art. Performance parameters may also include a combination of several individual performance parameters.

As used herein, the term "run queue" means the number of activities or applications waiting in line for the processor(s).

As used herein, the term "system time" means the percentage of time in which the existing processor(s) are engaged in performing system activities or applications.

As used herein, the term "user time" means the percentage of time in which the processor(s) are engaged in user tasks or applications.

As used herein, the term "donor candidate" means a system which is designated by a user as eligible to donate a processor to another system. The group of all donor candidates is referred to as the donor candidate pool. A donor candidate will become a donor if the system's composite parameter is less than the donor load threshold.

As used herein, the term "donor" means a system which has a composite parameter less than the donor load threshold. The group of all donors is referred to as a donor pool.

As used herein, the term "recipient candidate" means a system which is designated by a user as eligible to receive a processor from another system. The group of all recipient candidates is referred to as the recipient candidate pool. A recipient candidate will become a recipient if the system's composite parameter is greater than the recipient load threshold.

As used herein, the term "recipient" means a system which has a composite parameter greater than the recipient load threshold. The group of all recipients is referred to as a recipient pool.

As used herein, the term "donor load threshold" means a specific performance parameter level below which a donor may provide a processor to a recipient.

As used herein, the term "recipient load threshold" means a specific performance parameter level above which a recipient may receive a processor from a donor.

As used herein, the term "conditioning interval" means the period during which no processor reallocation will transpire. Sampling statistics may or may not be collected during this period, but no action will be taken upon these statistics until completion of the conditioning interval.

As used herein, the term "capture interval" means the interval at which statistics are collected on processor performance for various systems. The capture interval is any interval shorter than or equal to the sampling interval.

As used herein, the term "sampling interval" means the window of time over which sample statistics are captured. The sampling interval is equal to or greater than the capture interval. For example, statistics might be captured every five seconds for a five minute sampling interval. In that case, sixty statistical samples would be available at the end of the sampling interval. The sampling interval can be implemented as either a moving window or a discrete window.

As used herein, the term "moving window" means that, for each new performance parameter value which is added to the collection of samples, the oldest performance parameter value, formerly within the sampling interval, falls out of consideration. The advantage of using a moving window, vis-á-vis a discrete window, is that the moving window provides greater responsiveness in providing processor resources when and where they are needed. The use of a moving window normally requires computation of the composite parameter once for each sample taken.

As used herein, the term "discrete window" means that the sampling window is reset on a regular basis and those samples are considered in individual, non-overlapping time periods. The advantage of using a discrete window, vis-á-vis a moving window, is that the discrete window requires fewer processing resources because the composite parameter is only calculated once per sampling interval.

As used herein, the term "composite parameter" means the average of the processor data accumulated over the sampling interval. The average used to calculate the composite parameter may be the mean, median, mode, or norm. Smoothing criteria may optionally be used to determine the composite parameter. An example of smoothing would be removing the high and low values of the data collected during the sampling interval.

As used herein, the term "controlling entity" means the computational device, either internal or external to the managed system, which manages the reallocation of processors. In a UNIX environment, this is known as the Hardware Management Console.

FIG. 1 is an illustration of computer network 90 associated with the present invention. Computer network 90 comprises local machine 95 electrically coupled to network 96. Local machine 95 is electrically coupled to remote machine 94 and remote machine 93 via network 96. Local machine 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network that may contain the present invention and is not meant as an architectural limitation.

Figure 2:
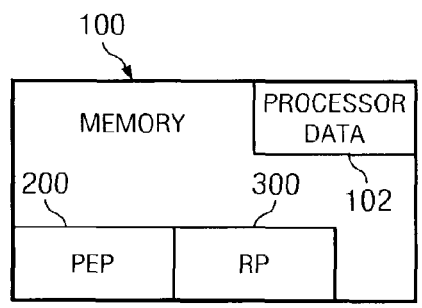
FIG. 2 is an illustration of the memory used to implement the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Performance Enhancement Program (PEP) 200. PEP 200 includes Reallocation Program (RP) 300. PEP 200 and RP 300 described herein can be stored within the memory of any computer depicted in FIG. 1. Alternatively, PEP 200 and RP 300 can be stored in an external storage device such as a removable disk or a CD-ROM. Memory 100 is illustrative of the memory within one of the computers of FIG. 1. Memory 100 also contains processor data 102. The present invention may interface with processor data 102 through memory 100. As part of the present invention, the memory 100 can be configured with PEP 200 and/or RP 300.

In alternative embodiments, PEP 200 and/or RP 300 can be stored in the memory of other computers. Storing PEP 200 and/or RP 300 in the memory of other computers allows the processor workload to be distributed across a plurality of processors instead of a single processor. Further configurations of PEP 200 and/or RP 300 across various memories are known by persons skilled in the art.

Figure 3:
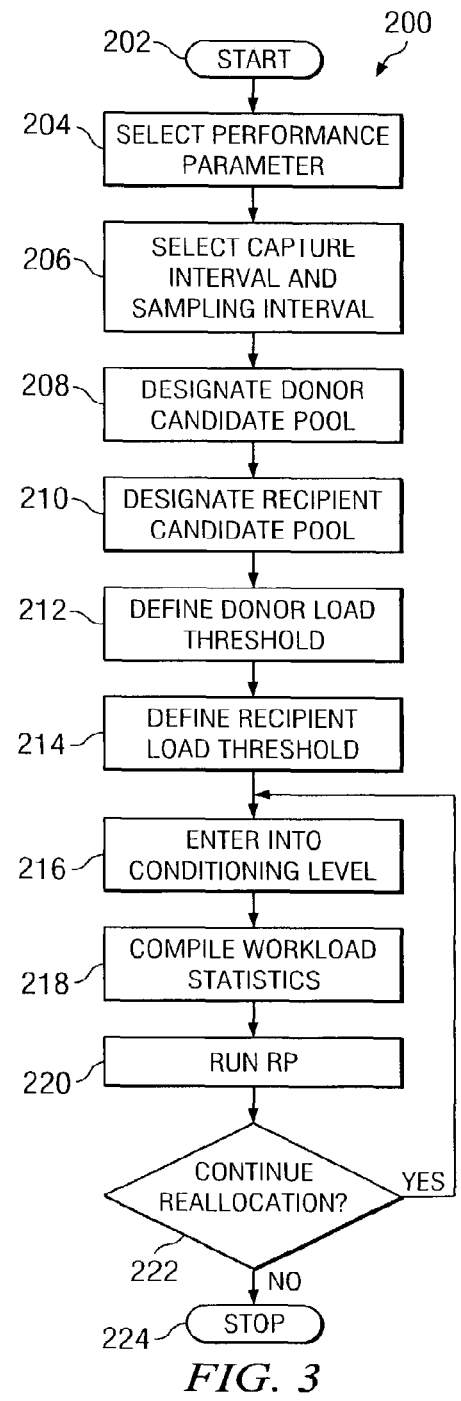
FIG. 3 is an illustration of the Performance Enhancement Program (PEP) of the present invention.

Turning to FIG. 3, a flowchart of the logic of PEP 200 is illustrated. PEP 200 is a program which allows the user to designate performance enhancement criteria. The user described herein may be, for example, a system administrator. PEP 200 starts (202) and the user selects at least one performance parameter (204). The performance parameter is used by RP 300 to measure the workload on the processors. The user then defines the capture interval and the sampling interval (206). The capture interval and the sampling interval are used by RP 300 to develop processor data for processor reallocation. The user then designates the donor candidate pool (208). In designating the donor candidate pool, the user selects the processors which are eligible to be donors. Donor candidates are generally computers or systems whose performance is of relatively low importance when compared to other computers or systems. Donor candidates may be either test or development computers or systems, or they could be applications of secondary criticality when compared with the criticality of the recipient candidates. Generally, all of the processors would be selected as potential donors unless the user wants to specifically exclude certain processors. The user then designates the recipient candidate pool (210). In designating the recipient candidate pool, the user selects the processors which are eligible to be recipients. Recipient candidates are computers or systems with relatively high priority or importance. Generally, all of the processors would be selected as potential recipients unless the user wants to specifically exclude certain processors.

The user then defines the donor load threshold (212). The donor load threshold is used by RP 300 to determine when a donor candidate becomes a donor. A heavily loaded donor will not donate processors unless its threshold value is set very high. The load threshold increases as system performance goes down, so that only a donor with a low load (i.e. relatively strong performance) may donate processors. The threshold may be set to provide whatever degree of flexibility is desired by the user. For example, if the performance parameter is the run queue, the performance parameter limit might be set at three waiting items in the run queue. Thus, when a processor has less than three items in the run queue, the processor will be identified as a potential donor.

The user then defines the recipient load threshold (214). The recipient load threshold is used by RP 300 to determine when a recipient candidate becomes a recipient. A lightly loaded recipient will not receive processors unless its threshold value is set very low. As the load on the recipient system increases, the performance of the recipient system goes down, thus making the slow-running recipient candidate ripe for a processor addition. For example, if the performance parameter is the run queue, the performance parameter limit might be set at four waiting items in the run queue. Thus, when a processor has more than four items in the run queue, the processor will be identified as a potential recipient.

PEP 200 then enters into a conditioning level (216). During the conditioning level, the processor reallocation is temporarily suspended between the donors and the recipients. During the conditional period, PEP 200 optionally compiles the workload statistics for the processors in the donor pool and in the recipient pool (218). If the workload statistics are compiled, then there may be some overlap between the data in the workload statistics and the data in the sampling interval. PEP 200 then runs RP 300 (220). PEP 200 then makes a determination whether to continue the processor reallocation (222). If the user wants to continue processor reallocation, PEP 200 returns to step 216. If the user does not want to continue processor reallocation, PEP 200 ends (224).

Figure 4:
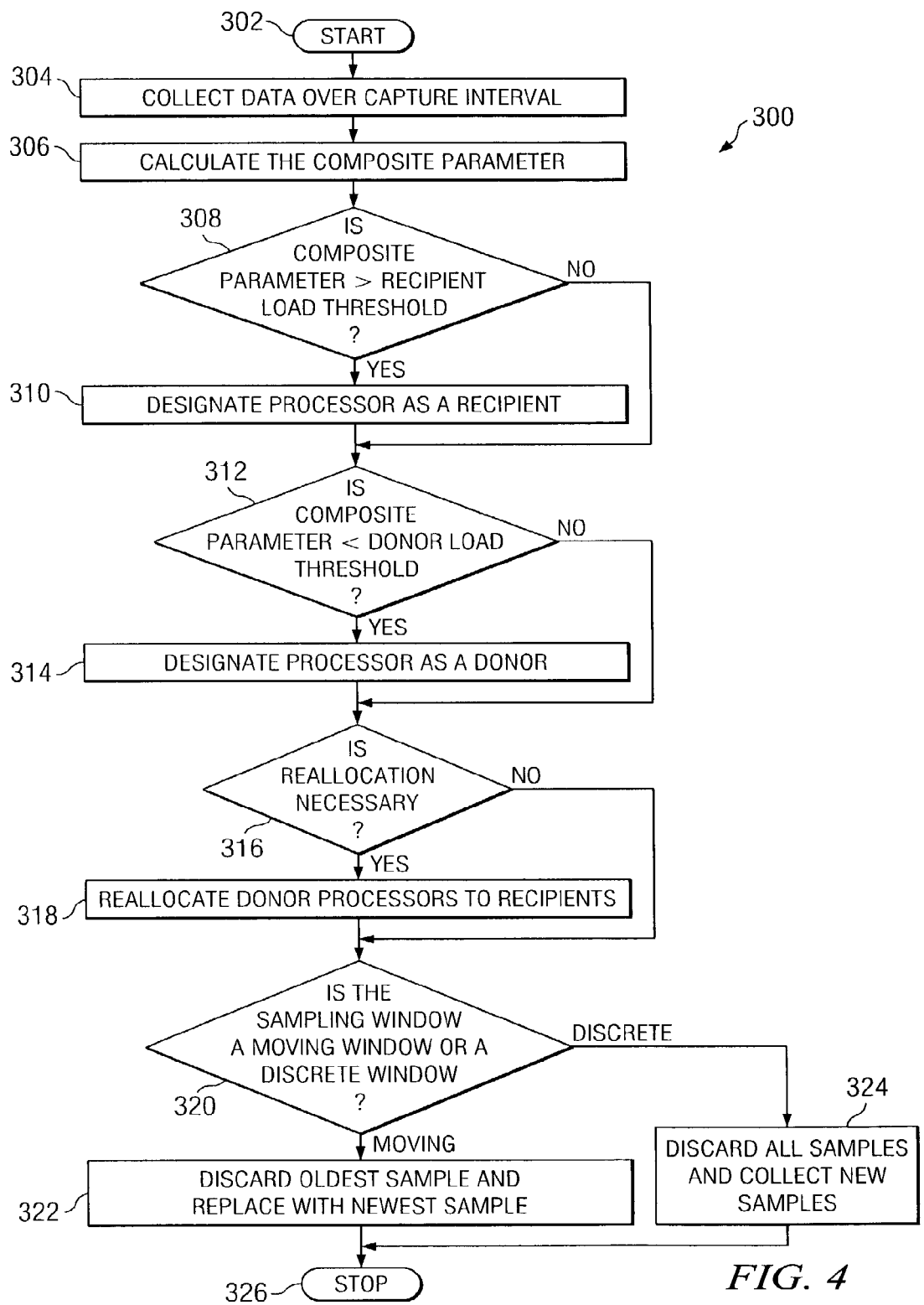
FIG. 4 is an illustration of the Reallocation Program (RP) of the present invention.

Turning to FIG. 4, a flowchart of the logic of RP 300 is illustrated. RP 300 is a program which reallocates the processors. RP 300 starts (302) when prompted by PEP 200. RP 300 collects samples of the processor data at the capture intervals over the sampling interval (304), saving the processor data to a cache memory or hard disk. For example, if the performance parameter is the run queue, the capture interval is five seconds, and the sampling interval is five minutes, then RP 300 records the number of items waiting in the run queue for each processor at the end of every fifth second for a total of five minutes. After the sampling interval has elapsed, RP 300 then calculates the composite parameter (306). RP 300 calculates the composite parameter by averaging the processor data.

RP 300 then analyzes the recipient candidates and makes a determination whether the composite parameter is greater than the recipient load threshold (308). If the composite parameter is not greater than the recipient load threshold, then RP 300 proceeds to step 312. If the composite parameter is greater than the recipient load threshold, then RP 300 designates that processor as a recipient (310) and proceeds to step 312. RP 300 then analyzes the donor candidates and makes a determination whether the composite parameter is less than the donor load threshold (312). If the composite parameter is not less than the donor load threshold, then RP 300 proceeds to step 316. If the composite parameter is less than the donor load threshold, then RP 300 designates that processor as a donor (314) and proceeds to step 316. RP 300 then makes a determination whether processor reallocation is necessary (316). RP 300 can optionally send the composite parameter to the controlling entity for the determination whether reallocation is necessary. Reallocation will be necessary if there is at least one donor and at least one recipient. If reallocation is not necessary, RP 300 proceeds to step 320. If reallocation is necessary, RP 300 reallocates the donor processors to the recipient processors according to a method designated by those skilled in the art (318). Persons skilled in the art are aware of numerous methods for allocating donor processors among recipient processors. When the processors are reallocated, tasks or applications queued for the recipient processor(s) will be moved to the donor processor(s). Persons skilled in the art are aware of how to move tasks or applications from one processor to another. RP 300 then proceeds to step 320.

At step 320, RP 300 then makes a determination whether the sampling window is a moving window or a discrete window (320). If the sampling window is a moving window, RP 300 discards the oldest data sample and replaces the oldest data sample with the newest data sample (322). RP 300 then ends (326). If at step 320 the sampling window is a discrete window, RP 300 discards all of the data samples and collects new data samples (324). RP 300 then ends (326).

Figure 5:
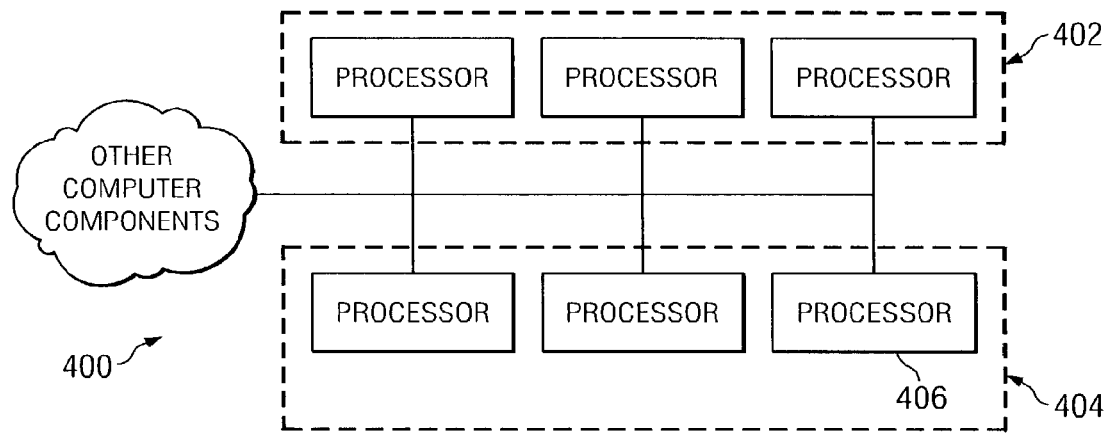
FIG. 5 is an illustration of a logically partitioned system in a single computer before application of the present invention.

PEP 200 and/or RP 300 may be implemented on a managed system which is a single computer, such as a server with a plurality of processors. Turning to FIG. 5, server 400 comprises six processors electrically coupled to other computer components. Persons skilled in the art are aware of the composition of other computer components which may be, for example, random access memory (RAM), read only memory (ROM), devices, device controllers, hard disk drives, floppy disk drives, CD-ROM drives, DVD drives, system connections, system controllers, I/O ports, monitors, user input devices, and the like.

The processors of server 400 are divided by logical partitioning into first virtual system 402 and second virtual system 404. If at least one of the processors of first virtual system 402 exceeds the recipient load threshold and at least one of the processors of second virtual system 404 is below the donor load threshold, then second virtual system 404 will be eligible to donate a processor to first virtual system 402. By moving a processor such as processor 406 to first virtual system 402, processor 406 can be donated to first virtual system 402.

Figure 6:
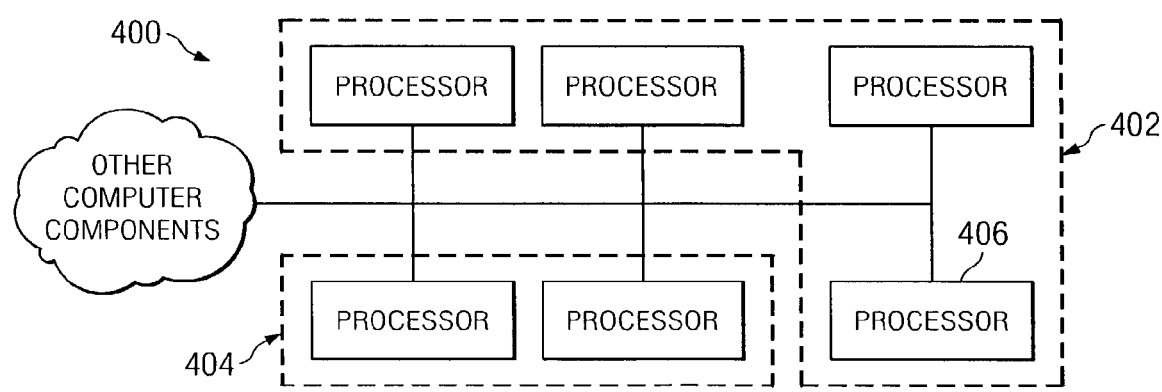
FIG. 6 is an illustration of a logically partitioned system in a single computer after application of the present invention.

Turning to FIG. 6, server 400 has been altered from the illustration in FIG. 5. In FIG. 6, processor 406 has been moved from second virtual system 404 to first virtual system 402 by PEP 200 of the present invention.

Figure 7:
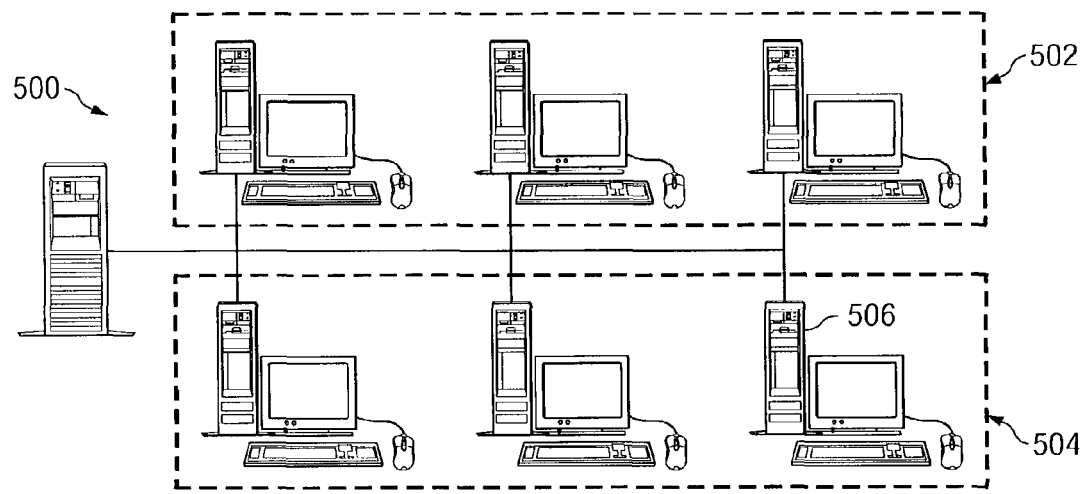
FIG. 7 is an illustration of a logically partitioned virtual system before application of the present invention.

The present invention is not limited in application to computer systems. PEP 200 and/or RP 300 may be implemented on a managed system which is a network of individual computers. Turning to FIG. 7, managed network 500 is divided by logical partitioning into first virtual network 502 and second virtual network 504. If at least one of the computers of first virtual network 502 exceeds the recipient load threshold and at least one of the computers of second virtual network 504 is below the donor load threshold, then second virtual network 504 will be eligible to donate a computer, and therefore a processor, to first virtual network 502. By moving a computer such as computer 506 to first virtual network 502, the processor of computer 506 can be donated to first virtual network 502.

Figure 8:
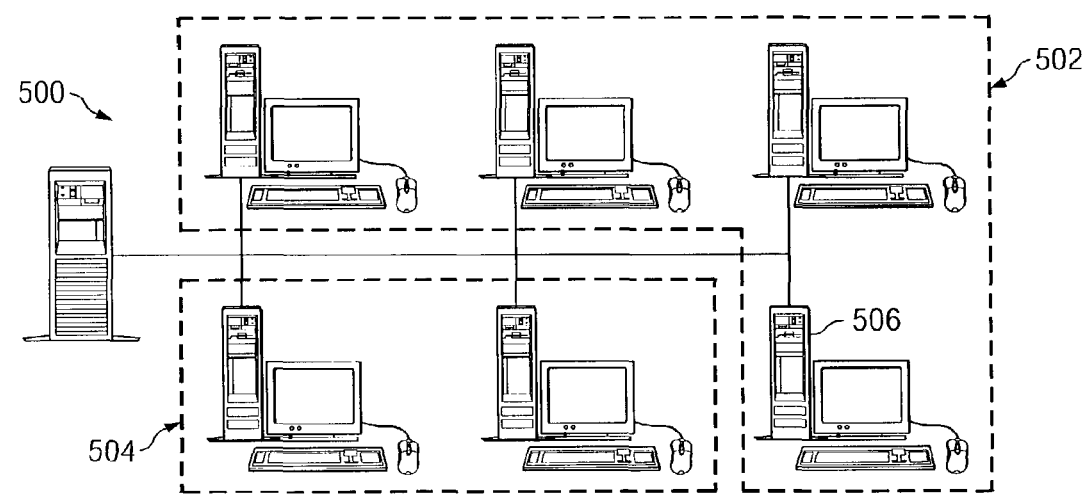
FIG. 8 is an illustration of a logically partitioned virtual system after application of the present invention.

Turning to FIG. 8, managed network 500 has been altered from the illustration in FIG. 7. In FIG. 8, computer 506 has been moved from second virtual network 504 to first virtual network 502 by PEP 200 of the present invention.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A program product comprising:
one or more computer-readable non-transitory storage devices;
program instructions, stored on at least one of the one or more storage devices, to designate a donor candidate pool by selecting at least one donor candidate processor that is eligible to be a donor, wherein the at least one donor candidate processor is included in the donor candidate pool;
program instructions, stored on at least one of the one or more storage devices, to designate a recipient candidate pool by selecting at least one recipient candidate processor that is eligible to be a recipient, wherein the at least one recipient candidate processor is included in the recipient candidate pool, and wherein the at least one donor candidate processor is eligible to be a donor because a type of use of the at least one donor candidate processor is less important than a type of use of the at least one recipient candidate processor, and because a performance of the at least one donor candidate processor is less important than a performance of the at least one recipient candidate processor;
program instructions, stored on at least one of the one or more storage devices, to define a conditioning interval, wherein workload statistics are collected during the conditioning interval for the at least one donor candidate processor and the at least one recipient candidate processor but no action is taken upon the workload statistics until completion of the conditioning interval, and wherein reallocation does not occur during the conditioning interval;
program instructions, stored on at least one of the one or more storage devices, to collect first sample statistics about a performance parameter, wherein overlap occurs between the first sample statistics and the workload statistics;
program instructions, stored on at least one of the one or more storage devices, to calculate a first composite parameter by averaging the first sample statistics;
program instructions, stored on at least one of the one or more storage devices, to determine if reallocation is necessary based on the first composite parameter; and
program instructions, stored on at least one of the one or more storage devices, responsive to a determination that reallocation is necessary, to move the at least one donor candidate processor to the recipient candidate pool.

2. The program product of claim 1, wherein:
the program instructions to collect first sample statistics about the performance parameter include program instructions to collect first sample statistics about the performance parameter for the donor candidate pool;
the program instructions to calculate the first composite parameter by averaging the first sample statistics include program instructions to calculate the first composite parameter for the donor candidate pool by averaging the first sample statistics; and
the program product further comprises:
program instructions, stored on at least one of the one or more storage devices, to collect second sample statistics about the performance parameter for the recipient candidate pool;
program instructions, stored on at least one of the one or more storage devices, to calculate a second composite parameter for the recipient candidate pool by averaging the second sample statistics;

program instructions, stored on at least one of the one or more storage devices, to define a sampling interval window of time, wherein the first sample statistics and the second sample statistics are collected at each one of a plurality of capture intervals that occur during the sampling interval window of time;

program instructions, stored on at least one of the one or more storage devices, to determine if reallocation is necessary based on the second composite parameter; and program instructions, stored on at least one of the one or more storage devices, responsive to a determination that reallocation is necessary based on the second composite parameter, to move the at least one recipient candidate processor to the donor candidate pool.

3. The program product of claim 2 further comprising:
program instructions, stored on at least one of the one or more storage devices, to determine if the sampling interval window of time is a moving window or a discrete window; and
program instructions, stored on at least one of the one or more storage devices, responsive to a determination that the sampling interval window of time is a moving window, to discard an oldest data sample and add a newest data sample.

4. The program product of claim 2 further comprising:
program instructions, stored on at least one of the one or more storage devices, to determine if the sampling interval window of time is a moving window or a discrete window; and
program instructions, stored on at least one of the one or more storage devices, responsive to a determination that the sampling interval window of time is a discrete window, to discard all of the first and second sample statistics and collect new first and second sample statistics.

5. The program product of claim 1, wherein:
the program instructions to collect first sample statistics about a performance parameter further include program instructions to collect the first sample statistics about the performance parameter for the donor candidate pool; and
the program product further comprises:
  program instructions, stored on at least one of the one or more storage devices, to collect second sample statistics about the performance parameter for the recipient candidate pool;
  program instructions, stored on at least one of the one or more storage devices, to calculate a second composite parameter for the recipient candidate pool by averaging the second sample statistics;
  program instructions, stored on at least one of the one or more storage devices, to define a donor load threshold that is a first particular performance parameter level;
  program instructions, stored on at least one of the one or more storage devices, to define a recipient load threshold that is a second particular performance parameter level;
  program instructions, stored on at least one of the one or more storage devices, to determine that reallocation is necessary based on the first composite parameter if the first composite parameter is less than the donor load threshold; and
  program instructions, stored on at least one of the one or more storage devices, to determine that reallocation is necessary based on the second composite parameter if the second composite parameter is greater than the recipient load threshold.

6. The program product of claim 1 wherein the donor candidate processor is a test processor, and wherein the first type of use is testing.

7. A program product for reallocating a processor from a first system to a second system, the program product comprising:
one or more computer-readable non-transitory storage devices;
program instructions, stored on at least one of the one or more storage devices, to designate a donor candidate pool by selecting at least one donor candidate processor that is eligible to be a donor, wherein the at least one donor candidate processor is included in the donor candidate pool;
program instructions, stored on at least one of the one or more storage devices, to designate a recipient candidate pool by selecting at least one recipient candidate processor that is eligible to be a recipient, wherein the at least one recipient candidate processor is included in the recipient candidate pool, and wherein the at least one donor candidate processor is eligible to be a donor because a type of use of the at least one donor candidate processor is less important than a type of use of the at least one recipient candidate processor, and because a performance of the at least one donor candidate processor is less important than a performance of the at least one recipient candidate processor;
program instructions, stored on at least one of the one or more storage devices, to define a conditioning interval, wherein workload statistics are collected during the conditioning interval for the at least one donor candidate processor and the at least one recipient candidate processor but no action is taken upon the workload statistics until completion of the conditioning interval, and wherein reallocation does not occur during the conditioning interval;
program instructions, stored on at least one of the one or more storage devices, to collect first sample statistics about a performance parameter, wherein overlap occurs between the first sample statistics and the workload statistics;
program instructions, stored on at least one of the one or more storage devices, to calculate a first composite parameter using the first sample statistics;
program instructions, stored on at least one of the one or more storage devices, to determine if reallocation is necessary based on the first composite parameter;
program instructions, stored on at least one of the one or more storage devices, responsive to a determination that reallocation is necessary based on the first composite parameter, to move the at least one donor candidate processor to the recipient candidate pool;
program instructions, stored on at least one of the one or more storage devices, to define a donor load threshold;
program instructions, stored on at least one of the one or more storage devices, to define a recipient load threshold; and
program instructions, stored on at least one of the one or more storage devices, to determine that reallocation is necessary based on the first composite parameter if the first composite parameter is less than the donor load threshold.

8. The program product of claim 7 further comprising:
program instructions, stored on at least one of the one or more storage devices, to calculate the first composite parameter by averaging the first sample statistics for the donor candidate pool;

program instructions, stored on at least one of the one or more storage devices, to collect second sample statistics about the performance parameter for the recipient candidate pool;

program instructions, stored on at least one of the one or more storage devices, to calculate a second composite parameter by averaging the second sample statistics for the recipient candidate pool;

program instructions, stored on at least one of the one or more storage devices, to define a sampling interval window of time, wherein the first sample statistics and the second sample statistics are collected at each one of a plurality of capture intervals that occur during the sampling interval window of time, and wherein the first composite parameter and the second composite parameter are calculated responsive to the sampling interval window of time ending;

program instructions, stored on at least one of the one or more storage devices, to determine if reallocation is necessary based on the second composite parameter if the second composite parameter is greater than the recipient load threshold; and program instructions, stored on at least one of the one or more storage devices, responsive to a determination that reallocation is necessary based on the second composite parameter, to move the at least one recipient candidate processor to the donor candidate pool.

9. The program product of claim 8 further comprising:

program instructions, stored on at least one of the one or more storage devices, to determine if the sampling interval window of time is a moving window or a discrete window; and program instructions, stored on at least one of the one or more storage devices, responsive to a determination that the sampling interval window of time is a moving window, to discard an oldest data sample and add a newest data sample.

10. The program product of claim 8 further comprising:

program instructions, stored on at least one of the one or more storage devices, to determine if the sampling interval window of time is a moving window or a discrete window; and program instructions, stored on at least one of the one or more storage devices, responsive to a determination that the sampling interval window of time is a discrete window, to discard all of the first and all of the second sample statistics and collect new first and second sample statistics.

11. The program product of claim 7 further comprising:

program instructions, stored on at least one of the one or more storage devices, to determine whether reallocation should continue; and program instructions, stored on at least one of the one or more storage devices, responsive to determining that reallocation should continue, to run a reallocation program.

12. The program product of claim 7 wherein the donor candidate processor is a test processor, and wherein the first type of use is testing.

* * * * *